United States Patent [19]
Mourlevat et al.

[11] Patent Number: 5,200,139
[45] Date of Patent: Apr. 6, 1993

[54] METHOD AND APPARATUS FOR PROTECTING A NUCLEAR REACTOR

[75] Inventors: Jean-Lucien Mourlevat, Noisy le Roi; Gérard Montanari, Houilles, both of France; Pierre Kockerols, Wilrijk, Belgium

[73] Assignee: Framatome, Courbevoie, France

[21] Appl. No.: 731,331

[22] Filed: Jul. 17, 1991

[30] Foreign Application Priority Data
Jul. 17, 1990 [FR] France .................. 90 09095

[51] Int. Cl.$^5$ ............................................ G21C 7/00
[52] U.S. Cl. .................................. 376/216; 376/242
[58] Field of Search ............... 376/215, 216, 235, 238, 376/241, 242, 244

[56] References Cited
U.S. PATENT DOCUMENTS

| | | | |
|---|---|---|---|
| 3,997,767 | 12/1976 | Torres et al. | 376/242 |
| 4,222,822 | 9/1980 | Mueller et al. | 376/217 |
| 4,308,099 | 12/1981 | Ball | 376/217 |
| 4,337,118 | 6/1982 | Sakurai et al. | 376/216 |
| 4,399,095 | 8/1983 | Morris | 376/216 |
| 4,678,622 | 7/1987 | Rowe et al. | 376/216 |
| 4,699,749 | 10/1987 | McAtee et al. | 376/242 |

FOREIGN PATENT DOCUMENTS 0212525 3/1987 European Pat. Off. .
2040522 8/1980 United Kingdom .

Primary Examiner—Daniel D. Wasil
Attorney, Agent, or Firm—Pollock, Vande Sande & Priddy

[57] ABSTRACT

A temperature regulation system of a pressurized water nuclear reactor is inhibited when a combination of the nuclear and the axial power difference exceeds a predetermined inhibit threshold.

7 Claims, 2 Drawing Sheets

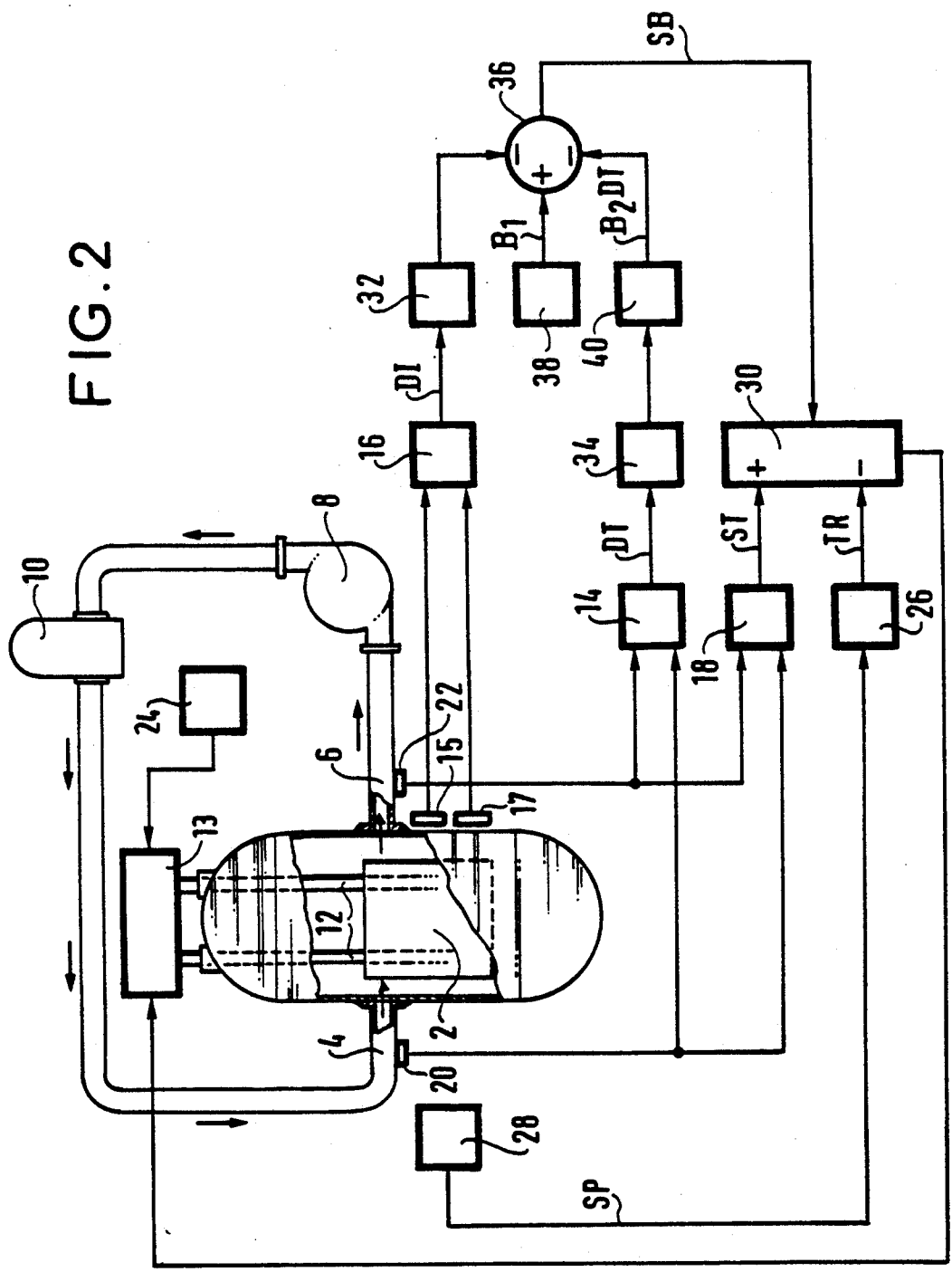

METHOD AND APPARATUS FOR PROTECTING A NUCLEAR REACTOR

FIELD OF THE INVENTION

The present invention relates to protecting nuclear reactors, i.e. to controlling such reactors in such a manner as to enable them at all times to deliver the power that is required for satisfying varying needs, while avoiding as much as possible both unnecessary burning of fuel and any risk of an accident. Very strict safety criteria are defined for limiting such risks, in particular with respect to the boilers constituted by such reactors.

The present invention relates more particularly to pressurized water nuclear boilers.

BACKGROUND OF THE INVENTION

In a power station including such a boiler, it is necessary to exercise accurate monitoring on the three-dimensional distribution of power within the core of the reactor. Such monitoring makes it possible both under normal operation and during accidental transients to make sure that safety criteria for the boiler are satisfied.

Thus, an authorized operating range for the core is defined by a network of straight line limits plotted in a plane (see FIG. 1) in which the coordinates are nuclear power and axial power difference. The axial power difference parameter, referred to below by the letters DI, is defined as being the difference between the power PH measured at the top of the core and the power PB measured at the bottom of the core.

$$DI = PH - PB$$

This parameter is representative of the axial distribution of power within the core.

By keeping the operating point of the core within the domain delimited in this manner, it is possible to ensure, inter alia that safety criteria are satisfied in the event of accidental loss of primary cooling fluid.

In addition, in order to avoid excessive variations in the temperature of the primary heat exchange fluid which cools the core, a program is defined for a reference temperature as a function of power level. When there is a difference between the measured temperature and the reference temperature, a regulation system is capable of acting automatically on the core control clusters in such a manner as to correct the difference. When this temperature regulation system is in action, the clusters are said to be in automatic mode. A cooling transient causes clusters to be extracted, and a heating transient causes them to be inserted.

A problem arises with respect to this regulation:

During certain accidental transients that cause the primary fluid to cool down suddenly, the temperature regulation system will cause the control clusters to be raised quickly if they are in automatic mode. However, such sudden extraction of the absorbent clusters has two consequences which are shown in one particular case by two curve segments C1 (solid line) and C2 (dashed line) in FIG. 1:

firstly, core reactivity increases, thereby raising the nuclear power DT as plotted up the Y axis of FIG. 1; and secondly, power distribution rises towards the top of the core, thereby increasing the axial power difference DI which is plotted along the X axis. In FIG. 1, the authorized operating domain is represented by an outer limit FA which is constituted by straight line segments.

In the event of a pre-accidental situation of the core represented by a point situated to the right of this operating domain, the nuclear power and axial power difference excursion may give rise to the operating point moving a considerable distance outside the domain. The characteristic evolution of such a cooling transient is shown by segments C1 and C2. A detailed analysis of this type of transient has shown that the core safety limits are approached and even exceeded without intervention of one of the reactor protection systems necessarily being guaranteed.

A particular object of the present invention is to limit the risk that may result from an uncontrolled excursion of the reactor operating point outside said operating domain in the event that said excursion is related to a rapid extraction of the temperature regulating group of clusters.

The invention is based on creating an inhibit signal for inhibiting instructions to extract the temperature regulation group whenever the reactor operating point leaves the operating domain dangerously. With conventional reactors, leaving the operating domain dangerously is equivalent to leaving it to the right in FIG. 1.

SUMMARY OF THE INVENTION

In the method of the invention, the reactor temperature regulation system is inhibited whenever a combination of the nuclear power and the axial power difference exceeds a predetermined inhibit threshold.

BRIEF DESCRIPTION OF THE DRAWINGS

An embodiment of the invention is described by way of example with reference to the accompanying drawings, in which:

FIG. 2 is an overall diagram of a reactor including a device of the present invention.

DETAILED DESCRIPTION

Figure 1:
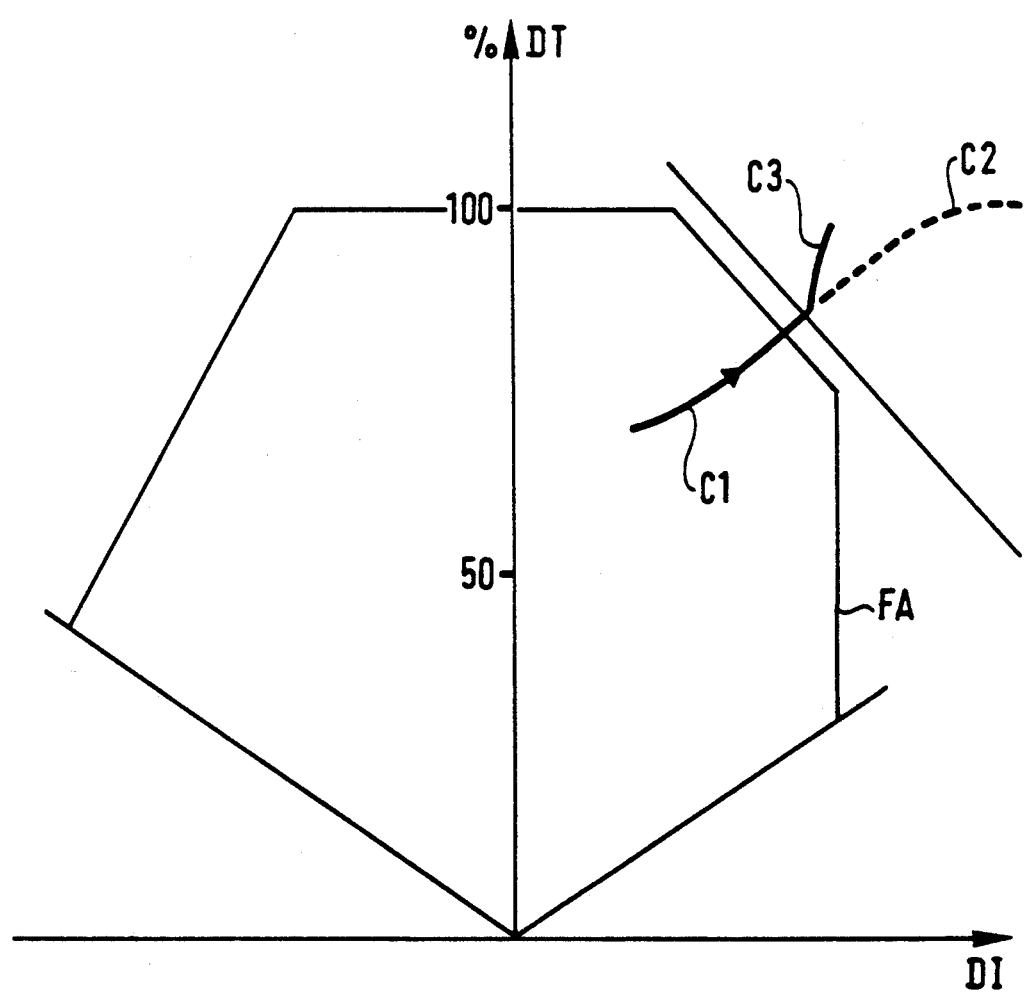
FIG. 1 is described in part above and is a graph showing variations in nuclear power plotted up the Y axis as a function of axial power difference plotted along the X axis.

As shown in FIG. 2, the present invention is applicable in general terms to a reactor comprising the following components:

A core 2 containing fuel rods in which a nuclear reaction takes place, giving off nuclear power which is distributed between the top and the bottom of the core and which is transformed into heat.

A heat exchange circuit 4, 6, 8 for causing a heat exchange fluid to enter the core via an inlet duct 4, to flow through the core under the action of a primary pump 8, and to leave the core via an outlet duct 6, thereby removing said heat. The circuit delivers the heat to an external heat receiver 10 having varying needs, and which is conventionally constituted by a steam generator 10 which transfers the power to a secondary circuit.

Control clusters 12 driven by mechanisms 13 for penetrating on command into the core from the top in order to control the nuclear reaction therein.

At least one power measurement system 14 for providing a total power signal DT representative of the nuclear power. This system takes the difference between the temperatures measured by two temperature detectors 20 and 30 disposed respectively on the inlet duct 4 and the outlet duct 6.

A power difference measuring system 16 for providing a power difference signal DI representative of axial nuclear power difference between the top and the bottom of the core. This system has two inputs connected to neutron detectors 15 and 17 disposed respectively facing the top and the bottom of the core 2.

A temperature measurement system 18 for providing an operating temperature signal representative of an operating temperature which is the temperature of said cooling fluid. This system takes the average of the temperatures measured by the detectors 20 and 22.

In conventional manner, the system for controlling the reactor comprises:

A power control system 24 acting on some of the control clusters 12 as a function, in particular, of the varying needs of the heat receiver 10, thereby ensuring that said receiver receives heat power which corresponds, at least approximately, to its needs.

A reference temperature defining circuit which receives a power signal SP representative of the nuclear power and delivered by a detector 28, said circuit generating a temperature reference signal TR representative of a reference temperature which depends on the nuclear power and which is such that the reactor operates under optimum conditions when, for each value of nuclear power, the operating temperature is equal to the reference temperature.

The temperature regulation system 30 which receives the operating temperature signal ST and the temperature reference signal TR and which acts on a temperature regulation group constituted by some of the control clusters 12, in a manner which is distinct from the power control system 24 and for the purpose of at least limiting the difference between the operating temperature and the reference temperature.

According to the present invention, the apparatus further includes a temperature regulation inhibit system 36 which receives the total power signal DT and the power difference signal DI and which combines them to obtain a combination which defines a composite power based on these signals, the temperature regulation inhibit system inhibiting the temperature regulation system 30 whenever said composite power exceeds a predetermined inhibit threshold. This threshold B1 is symbolically supplied in FIG. 2 by a generator 38.

The inhibit circuit preferably includes a multiplier 40 for multiplying at least one of the total power signal DT and the power difference signal DI by a positive coefficient $B_2$ so as to obtain a positive linear combination of the coefficients $DT + B_2 \cdot DI$.

Filtering is preferably performed on at least one of these signals with composite power being defined after such filtering.

The filtering is performed by circuits 32 and 34 having transfer functions of the type $(1+T_2p)/(1+T_1p)$ for said power difference signal DI, and of the type $1/(1+T_3p)$ for said total power signal DT, where $T_1$, $T_2$, and $T_3$ are time constants specific to the nuclear reactor being controlled, as are the coefficients such as $B_2$ and the inhibit threshold $B_1$.

In FIG. 1, the nuclear power corresponding to the inhibit threshold is represented by a straight line having the equation:

$$DT = B_1 - B_2 \cdot DI$$

By implementing the present invention, the evolution of the above-mentioned cooling transient becomes as shown by the succession of segments C1 and C3.

In a practical implementation of the invention, nuclear power is represented as mentioned above by the measured temperature difference DT between the hot outlet duct 6 and the cool inlet duct 4. An inhibit signal SB (see FIG. 2) is generated when this power, after filtering, exceeds a limit value defined on the basis of the signal DI as filtered at 32. This is defined as follows:

$$DT/(1+T_3p) \geq DI \cdot (B_1 - B_2) \cdot (1+T_1p)/(1+T_2p)$$

Where the fractions involving $T_xp$ designate transfer functions representative of the effects of the filter circuits 34 and 32, respectively.

The advance/retard filter 32 may anticipate the evolution of the signal DI. The filter 34 eliminates measurement noise from the signal DT. The reference values $B_1$ and $B_2$ and the time constants $T_1$ to $T_3$ need to be optimized as a function of the boiler in question and of its authorized operating domain.

In general, this inhibit instruction is preferably designed so that even in the event of a single failure in any one of the parts of the apparatus, the inhibit instruction is nevertheless performed by virtue of a redundant system. Further, in order to avoid inhibition taking place when not necessary, an effective inhibit instruction is preferably a secondary instruction delivered at the output from a 2 out of n logic circuit where n is the number of parallel systems for generating primary inhibit signals.

Initial simulations of the operation of the above-described apparatus in the event of cooling accidents has shown that protection is ensured in satisfactory manner. It enables non-negligible margins to be obtained relative to core safety criteria.

These margins may be made use of in fuel management, thereby facilitating the definition of loading planes.

We claim:

1. A method of protecting a nuclear reactor wherein a temperature regulation system of said reactor is inhibited whenever a combination of nuclear power and an axial power difference between a top and a bottom of a core of said reactor exceeds a predetermined inhibit threshold, said reactor comprising:

a core containing fuel rods in which nuclear reaction takes place, giving off nuclear power which is distributed between top and bottom of the core and which is transformed into heat;

a heat exchange circuit for causing heat exchange fluid to penetrate into the core via an inlet duct, for causing the fluid to circulate through the core, and for removing it therefrom via an outlet duct, thereby removing said heat, said circuit providing heat to an external heat receiver having varying requirements;

control clusters penetrating in controlled manner into the core from the top thereof in order to control said nuclear reaction therein;

at least one power measuring system for providing a total power signal representative of said nuclear power;

a power difference measuring system for providing a power difference signal representative of an axial difference in nuclear power between the top and the bottom of the core;

a temperature measurement system for providing an operating temperature signal representative of an operating temperature which is a temperature of said heat exchange fluid;

a power control system acting on some of said control clusters as a function of varying needs of said heat receiver so that said receiver receives heat power which corresponds, at least approximately, to the needs of said receiver;

a reference temperature defining circuit receiving a power signal representative of said nuclear power, and generating a temperature reference signal representative of a reference temperature which depends on said nuclear power and which is such that said reactor operates under optimum conditions when said operating temperature is equal to said reference temperature at each value of said nuclear power; and a temperature regulation system receiving said operating temperature and said temperature reference signal and acting on control clusters in a manner which is different from said power control system for the purpose of at least limiting a difference between said operating temperature and said reference temperature;

said method comprising the steps of (a) combining said total power signal and said power difference signal to define a composite power, and (b) inhibiting said temperature regulation system when said composite power exceeds a predetermined inhibit threshold.

2. A method according to claim 1, wherein said composite power signal is a linear combination having positive coefficients of said total power signal and of said power difference signal, said coefficients and said inhibit threshold being specific to said nuclear reactor.

3. A method according to claim 1, wherein filtering is performed on at least one of said total power signal and said power difference signal, said combination being performed after said filtering.

4. A method according to claim 3, wherein said filtering is performed by circuits having transfer functions of the type $(1+T_2 p)/(1+T_1 p)$ for said power difference signal and of the type $1/(1+T_3 p)$ for said total power signal, where $T_1$, $T_2$, and $T_3$ are time constants specific to said nuclear reactor.

5. A method according to claim 1, wherein said total power signal is representative of the rise in temperature of said heat exchange fluid from said inlet duct to said outlet duct.

6. Apparatus for controlling a nuclear reactor, the apparatus being associated with a reactor comprising:

a core containing fuel rods in which nuclear reaction takes place, giving off nuclear power which is distributed between the top and the bottom of the core and which is transformed into heat;

a heat exchange circuit for causing a heat exchange fluid to penetrate into the core via an inlet duct, for causing the fluid to circulate through the core, and for removing it therefrom via an outlet duct, thereby removing said heat, said circuit providing heat to an external heat receiver having varying requirements;

control clusters penetrating in controlled manner into the core from the top thereof in order to control said nuclear reaction therein;

at least one power measuring system for providing a total power signal representative of said nuclear power;

a power difference measuring system for providing a power difference signal representative of an axial difference in nuclear power between the top and the bottom of the core;

a temperature measurement system for providing an operating temperature signal representative of an operating temperature which is a temperature of said heat exchange fluid;

a power control system acting on some of said control clusters as a function in particular of varying needs of said heat receiver so that said receiver receives heat power which corresponds, at least approximately, to its needs;

a reference temperature defining circuit receiving a power signal representative of said nuclear power, and generating a temperature reference signal representative of a reference temperature which depends on said nuclear power and which is such that said reactor operates under optimum conditions when said operating temperature is equal to said reference temperature at each value of said nuclear power; and a temperature regulation system receiving said operating temperature and said temperature reference signal and acting on a temperature regulation group constituted by some of said control clusters in a manner which is different from said power control system for the purpose of at least limiting the difference between said operating temperature and said reference temperature;

wherein said apparatus further includes a temperature regulation inhibit system receiving said total power signal and said power difference signal and deriving a combination of these signals defining a composite power, said temperature regulation inhibit system inhibiting said temperature regulation system when said composite power exceeds a predetermined inhibit threshold.

7. Apparatus according to claim 6, wherein said inhibit circuit includes means for multiplying at least one of said total power signal and said power difference signal by a positive coefficient so as to perform a linear combination having positive coefficients.

* * * * *